United States Patent Office 3,644,362
Patented Feb. 22, 1972

3,644,362
1,2-DIAZABICYCLO[2.2.2]OCTANES
Philip M. Carabateas, Shodack, N.Y., assignor to Sterling Drug Inc., New York, N.Y.
No Drawing. Continuation-in-part of application Ser. No. 411,706, Nov. 17, 1964, which is a continuation-in-part of application Ser. No. 236,705, Nov. 9, 1962. This application June 30, 1969, Ser. No. 837,953
Int. Cl. C07d 51/02
U.S. Cl. 260—250 A
25 Claims

ABSTRACT OF THE DISCLOSURE

Novel 1,2-diazabicyclo[2.2.2]octanes are prepared by intra-molecularly cyclizing a 1-aminopiperidine compound containing in the 4-position a substituent capable of reacting with the 1-amino group to form either one or two carbon-to-nitrogen bonds, for example, cyclizing a 1-amino-4-Y-[C(=O)B]-piperidine, where Y is H, Ar-lower-alkyl or Ar where Ar is phenyl and related groups, and B is O-(lower-alkyl) or R' where R' is lower-alkyl, lower-cycloalkyl, lower-alkenyl or various substituted lower-alkyl groups to yield, respectively, 3-oxo-4-Y-1,2-diazabicyclo[2.2.2]octane or 3 - B(or R') - 1,2 - diazabicyclo[2.2.2]octane which is used to prepare various 2-substituted-1,2-diazabicyclo[2.2.2]octanes or other 3-substituted-1,2-diazabicyclo[2.2.2]octanes. The 1,2-diazabicyclo[2.2.2]octanes are useful antitussive agents.

---

This invention relates to compositions of matter classified in the art of chemistry as diazabicyclooctanes and to processes for making and using such compositions.

This application is a continuation-in-part of my copending application Ser. No. 411,706, filed Nov. 17, 1964, and now abandoned, which in turn is a continuation-in-part of my copending application Ser. No. 236,705, filed Nov. 9, 1962, now U.S. Pat. 3,198,801, issued Aug. 3, 1965.

The invention sought to be patented, in composition aspect, is described as residing in the concept of a chemical compound having as a constituent part the novel 1,2-diazabicyclo[2.2.2]octane ring system. I.

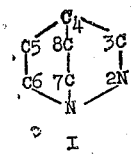

The structure of the embodiments of my invention consists of the above skeletal formula wherein the substituents attached to the various ring members are selected from organic and inorganic radicals known in the art of organic chemistry. The physical embodiments having this structure have been found to be useful as pharmaceutical agents and as intermediates for the preparation of a wide variety of compounds having useful pharmacological and chemotherapeutic activities.

The invention sought to be patented, in its process aspect, is described as residing in the concept of intra-molecularly cyclizing a 1-aminopiperidine compound containing in the 4-position a substituent capable of reacting with the 1-amino group to form either one or two carbon-to-nitrogen bonds.

The 1-amino-4-substituted-piperidine intermediate compounds have the general Formula II,

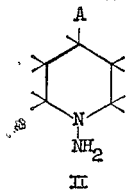

wherein A is a substituent bonded to the piperidine ring through a carbon atom and which is capable of reacting with the 1-amino group with the formation of at least one carbon-nitrogen covalent bond. Examples of substituents represented by the term A include such groups as —COOH, —COOR, —CONH$_2$, —CHO, —COR, —CH(Hal)R, —C(Hal)$_2$R, —CN, —CH(OSO$_2$R)R, —CH=CH—COOR, and —CH=CH—CO—R.

In the above substituents, and throughout this specification, the term R means an aliphatic, cycloaliphatic or aromatic radical or various combinations thereof, i.e., aromatic-aliphatic, cycloaliphatic-aliphatic, aromatic-cycloaliphatic, and the like, and Hal means a halogen atom, i.e., chlorine, bromine, iodine, or fluorine.

The 1-amino-4-substituted piperidine intermediate compounds can be prepared by reducing 1-nitroso-4-A-piperidine compounds with a mild reducing agent, for example, active metal-acid combinations, as exemplified by zinc and acetic acid, amalgamated aluminum and water (moist ether), sodium and ethanol and the like; hydrogenation over mild catalysts, as exemplified by palladium-on-charcoal and rhodium-on-charcoal; sodium hydrosulfite; and, lithium aluminum hydride. Methyl 1-aminopiperidine-3-carboxylate is disclosed and claimed in said U.S. Pat. 3,198,801.

The 1-nitroso-4-A-piperidines, which are the immediate precursors of the above 1-amino-4-A-piperidines, are prepared from 1-unsubstituted piperidine compounds by the reaction of the later with nitrous acid at 0–30° C. The nitrous acid is generally prepared in situ from a nitrite (e.g., sodium nitrite) and a mineral or other strong acid (e.g., hydrochloric acid). Illustrative intermediate 1-nitroso-4-Y-4-[C(=O)B]-piperidines where B is lower-alkoxy, lower-alkyl, phenyl-lower-alkyl and di-(lower-alkyl)-amino-lower-alkyl, and Y is H, phenyl-lower-alkyl, phenyl, naphthyl, thienyl and substituted-phenyl are disclosed and claimed in the Elpern U.S. Pat. 3,284,458, issued Nov. 8, 1966.

The 1-unsubstituted piperidine compounds employed as starting materials for the preparation of the compounds of my invention are a known class of compounds and are readily prepared by procedures well known to those skilled in the art. I prefer to prepare them by hydrogenolysis of the corresponding N-benzyl compounds in the presence of a palladium-charcoal catalyst. The N-benzylpiperidines are prepared, for example, by methods discussed by Suter, Medicinal Chemistry, vol. II, John Wiley and Sons, New York, 1956; pp. 219–225.

The manner and process for making and using my invention will now be generally described so as to enable a person skilled in the art to make and use the same, as follows:

According to one procedure, the physical embodiments of my invention are prepared by heating a compound of general Formula II to 50–300° C., whereby cyclization occurs, resulting in the formation of the 1,2-diazabicyclo[2.2.2] ring system. For example, when 1-amino-4-methoxycarbonylpiperidine (Formula II, A is —COOH$_3$ and all free valence bonds are satisfied by hydrogen atoms) is heated to approximately 200° C., the compound 3-oxo-1,2-diazabicyclo[2.2.2]octane is produced.

The temperature at which cyclization occurs depends upon the nature of the particular intermediate 1-aminopiperidine compound employed. In certain instances it occurs at room temperature or below, as illustrated by a second procedure for preparing embodiments of my invention:

When 1-nitroso-4-phenyl-4-propionylpiperidine is reduced with zinc dust and acetic acid at 15–20° C., the 1-amino-4-phenyl-4-propionylpiperidine first formed in the reaction cyclizes spontaneously at the reaction temperature, forming the unisolated compound 3-ethyl-4-phenyl-1,2-diazabicyclo[2.2.2] oct-2-ene of the formula

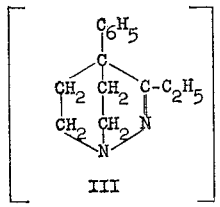

III

This compound is concomitantly reduced by the zinc dust and acetic acid reducing medium to the isolated product 3-ethyl-4-phenyl-1,2-diazabicyclo[2.2.2]octane.

From the observations above described, I conclude that the operable temperature range of my invention, in its process aspect, is determined at its upper limit by the thermal stability of the intermediate and final products, and at its lower limit by the speed of the cyclization, which is dependent upon the nature of the intermediate. In general, I prefer to carry out the process at temperatures between 0 and 300° C.

The process can be conducted either in the presence or absence of a solvent, but I generally prefer to employ a solvent or suspending medium. For example, at low temperatures the acid-metal reducing medium is a suitable solvent, as described above, and at temperatures of 150°–250° C. I generally suspend the reactant in an eutectic mixture of biphenyl and diphenyl ether (Dowtherm A).

Thus, the process of the invention is illustrated by the process for preparing a 1,2-diazabicyclo[2.2.2]octane of Formula IV

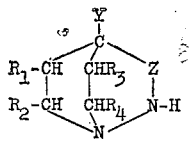

IV where $R_1$, $R_2$, $R_3$ and $R_4$ are each H or lower-alkyl, Y is H, Ar-lower-alkyl, or Ar where Ar is phenyl, naphthyl, pyridyl, furyl, thienyl, quinolinyl, or phenyl, naphthyl or quinolinyl substituted in a benzene ring thereof by from one to three substituents selected from lower-alkyl, halo, lower-alkoxy, benzyloxy, trifluoromethyl, lower-alkylmercapto, lower-alkanesulfonyl, lower-alkanoyloxy or di-(lower-alkyl)amino; and, Z is C=O or CHR′, where R′ is lower-alkyl, lower-cycloalkyl, lower-alkenyl, Ar′-lower-alkyl, piperidino-lower-alkyl, pyrrolidino-lower-alkyl, morpholino-lower-alkyl or di-(lower-alkyl)amino-lower-alkyl, where Ar′ is phenyl or phenyl substituted by from one to three substituents selected from lower-alkyl, halo or lower-alkoxy, which comprises subjecting a compound of the Formula V

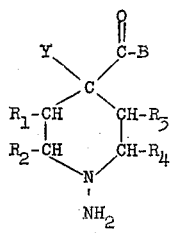

V to a temperature within the range of about 0° C. to 300° C. sufficient to cause intramolecular cyclization, wherein B is —O—(lower-alkyl) or R′.

The compounds prepared by the above methods can be used as intermediates for the preparation of a variety of products having the 1,2-diazabicyclo[2.2.2]octane ring system as a constituent part. For example, the secondary nitrogen atom at the 2-position of the ring has a replaceable H atom and is easily acylated, for example with carboxylic and sulfonic acid halides or with carboxylic acid anhydrides. The secondary nitrogen can also be alkylated with various alkylating agents, for example, alkyl esters of strong acids (alkyl halides, alkyl sulfates, and alkyl arenesulfonates), epoxides, for example, ethylene oxide, styrene oxide, and the like, reactive vinyl compounds, for example, acrylonitrile, vinyl-pyridine, and the like, and reactive hydroxylated compounds such as glycolonitrile. The secondary amine can enter into various other alkylation reactions such as Mannich alkylation and Eschweiler-Clarke methylation. The acylated compounds can be reduced with suitable reducing agents, for example, lithium aluminum hydride, to give alkylated and aralkylated products. The compounds also react with isocyanates and isothiocyanates to form substituted ureas and thioureas, respectively. Other common reactions similar to the ones described will be evident to one skilled in the art.

An oxo group in position 3 of the 1,2-diazabicyclo-[2.2.2]octane ring is also reactive and is subject to the various reactions characteristic of an amide carbonyl group. For example, it can be reduced to methylene with suitable reducing agents (for example, lithium aluminum hydride), and it reacts with phosphorus pentasulfide to form the thiono group.

The compounds of Formula IV where Ar is substituted by hydroxy are obtained by hydrogenolysis of the corresponding compounds where Ar is substituted by benzyloxy or, alternatively, by hydrolysis of the corresponding compounds where Ar is substituted by lower-alkanoyloxy.

The 1,2-diazabicyclo[2.2.2]octanes of the invention have the general Formula VI

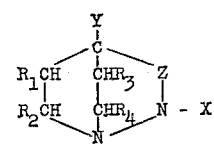

VI wherein: $R_1$, $R_2$, $R_3$ and $R_4$ are each H and lower-alkyl; X is H, lower-alkyl, Ar-lower-alkyl, lower-alkenyl, Ar-lower-alkenyl, lower-alkynyl, lower-alkanoyl, halo-lower-alkanoyl, carboxy-lower-alkanoyl, Ar - lower - alkanoyl, lower-alkenoyl, Ar-lower-alkenoyl, Ar-CO, lower-alkanesulfonyl, Ar′-SO$_2$—, carbamyl, thiocarbamyl, N-Ar′-thiocarbamyl, N - Ar′ - carbamyl, N-(lower-alkyl)carbamyl, N-(lower - alkyl)thiocarbamyl, N-(lower-alkenyl) carbamyl, N-(lower - alkenyl)thiocarbamyl, cyano-lower-alkyl, hydroxy - lower - alkyl, amino-lower-alkyl, piperidino - lower - alkyl, pyrrolidino - lower - alkyl, morpholino - lower - alkyl, or di-(lower - alkyl)amino-lower-alkyl; Y is H, OH, NH$_2$, Ar-lower alkyl, or Ar; Z is C=O, C=S, C=NH, CH$_2$ or CHR′, where R′ is lower-alkyl, lower-cycloalkyl, lower alkenyl, Ar′ - lower - alkyl, piperidino-lower-alkyl, pyrrolidino - lower - alkyl, morpholine - lower - alkyl, and di-(lower-alkyl)amino-lower-alkyl. Ar herein is phenyl, naphthyl, pyridyl, furyl, thienyl, quinolinyl, or phenyl, naphthyl or quinolinyl substituted in a benzene ring thereof by from one to three substituents selected from lower-alkyl, halo, lower - alkoxy, benzyloxy, hydroxy, trifluoromethyl, lower-alkylmercapto, lower - alkanesulfonyl, lower - alkanoyloxy or di-(lower-alkyl)amino; and Ar′ is phenyl or phenyl substituted by from one to three substituents selected from lower-alkyl, halo or lower-alkoxy.

As used herein "lower-alkyl" means a straight- or branched-chain saturated aliphatic radical having from one to seven carbon atoms in the chain. Examples of lower-alkyl radicals represented by R include methyl, ethyl, n-propyl, isopropyl, n-butyl, isobutyl, tert-butyl, n-amyl, n-hexyl, n-heptyl, and the like.

As used herein, "lower alkenyl" means a straight- or branched-chain alipatic radical having at least one double-bond and containing from three to seven carbon atoms. Examples of lower-alkenyl radicals represented by X are allyl, methallyl, 1 - (2 - butenyl), 1 - (2,4 - pentadienyl), 1-(3-hexenyl) and 1-(3-heptenyl).

As used herein, "lower-alkynyl" means a straight- or branched-chain aliphatic-radical having at least one triple-bond and containing from three to seven carbon atoms. Examples of lower alknyl include propargyl, 1-(2-butynyl), 1-(2-heptynyl) and the like.

As used herein, "lower-alkanoyl" means a straight- or branched-chain saturated aliphatic carboxylic acid radical having from one to seven carbon atoms in the chain. Examples of lower-alkanoyl radicals represented by X are formyl, acetyl, propionyl, butyryl, isobutyryl, valeryl, caproyl, isocaproyl, heptanoyl, and the like.

As used herein, "lower-alkenoyl" means a straight- or branched-chain unsaturated aliphatic carboxylic acid radical having from three to seven carbon atoms and having at least one double bond. Examples of lower-alkenoyl radicals represented by X are acrylyl, methacrylyl, 1-(2-butenoyl), 1-(3-hexenoyl), 1-(6-heptenoyl), and 1-(2,4-pentadienoyl).

As used herein, "lower-alkane" of "lower-alkanesulfonyl" means a straight- or branched-chain saturated aliphatic radical having from one to seven carbon atoms in the chain; that is, it is the same as "lower-alkyl," above illustrated.

As used herein, "halo-lower-alkanoyl" means a straight- or branched-chain saturated aliphatic carboxylic acid radical having from two to seven carbon atoms in the chain and having from one to three halo substituents. Examples of halo-lower-alkanoyl represented by X are chloroacetyl, bromoacetyl, dichloroacetyl, difluoroacetyl, trifluoroacetyl, diiodoacetyl, 3-chloropropanol, 2,2-dichloropropanoyl, 2-bromobutanoyl, 2,2,3-trichlorobutanoyl, 2-chlorohexanoyl and 2,3-dichloroheptanoyl, and the like.

As used herein, "lower-cycloalkyl" means a straight- or branched-chain saturated cycloaliphatic radical having from three to six ring-carbon atoms and having from three to seven carbon atoms. Examples of lower-cycloalkyl radicals represented by R' are cyclopropyl, cyclopentyl, cyclohexyl, 2-methylcyclopropyl, 2,3-dimethylcyclopropyl, 2-methylcyclohexyl, and the like.

The 1,2-diazabicyclo[2.2.2]octanes of the invention, e.g., those of Formulas IV and VI, are useful in the free base form or in the form of their acid-addition or quaternary ammonium salts.

The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

Quaternary ammonium salts of the 1,2-diazabicyclo[2.2.2]octanes of the invention involve quaternization at the 1-position and/or 2-position of the 1,2-diazabicyclo[2.2.2]octane ring. These salts are useful for further identification of the aforesaid compounds. The quaternary ammonium salts are obtained by the addition of esters having a molecular weight less than about 200 to the free base form of the compounds. A preferred class of esters comprises lower-alkyl, lower-alkenyl or benzyl esters of inorganic acids or organic sulfonic acids of the formula Z'—An' where Z' is lower-alkyl, lower-alkenyl or benzyl and An' is an anion of a strong acid. Z' when benzyl can be substituted in the benzene ring by from one to three substituents illustrated by, but not limited to lower-alkyl, lower-alkoxy, halo, nitro, lower-alkylamino, lower-alkylmercapto, and the like. Z'—An' is thus illustrated by, but not limited to methyl chloride, methyl bromide, methyl iodide, ethyl bromide, propyl chloride, 2-hydroxyethyl bromide, allyl chloride, allyl bromide, methyl sulfate, methyl benzenesulfonate, methyl 4-toluenesulfonate, benzyl chloride, benzyl bromide, 4-chlorobenzyl chloride, 4-nitrobenzyl chloride, o-chlorobenzyl chloride, 3,4-dichlorobenzyl chloride, 4-methoxybenzyl chloride, and the like. The quaternary ammonium salts are prepared by mixing the free base and the lower-alkyl, lower-alkenyl or benzyl esters in an organic solvent inert under the conditions of reaction, for example, ethanol, methanol, ether, acetonitrile and the like, or alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

All salts, whether toxic or non-toxic, are useful as intermediates in the purification of the free bases or in the formation of other salts by ion exchange procedures. They also serve as characterizing derivatives of the free bases.

Pharmacological evaluation of the embodiments of my invention has shown that they possess useful pharmacological properties. A particularly important property of the 1,2-diazabicyclo[2.2.2]octanes of the invention is their ability to suppress the cough reflex; that is, they are useful antitussive agents. The antitussive activity of the compounds was determined by measuring the extent of inhibition of the cough produced by mechanical stimulation of the trachea in anesthetized cats following oral administration of the compounds.

The actual determination of the numerical antitussive data definitive for a particular 1,2-diazabicyclo[2.2.2]octane of the invention is readily obtained by standard antitussive test procedures by technicians versed in antitussive testing, without any need for any extensive experimentation.

The 1,2-diazabicyclo[2.2.2]octanes of the invention can be prepared for use by conventional pharmaceutical procedures; that is, by dissolving or suspending them in a pharmaceutically acceptable vehicle, e.g., as syrups or elixers, aqueous alcohol, glycol, oil solution, or oil-water emulsions, preferably for oral administration; or by incorporating them in unit dosage form as tablets or capsules for oral administration either alone or in combination with conventional adjuvants, e.g., calcium carbonate, starch, lactose, talc, magnesium stearate, gum acacia, and the like. Alternatively, and where compatible, the compounds of the invention can be formulated as above in combination with one or more known antitussive agents.

The molecular structures of the 1,2 - diazabicyclo[2.2.2]octanes of the invention were assigned on the basis of study of their infrared, ultraviolet and nuclear magnetic resonance spectra, and confirmed by the correspondence of calculated and found values of the elemental analyses for representative examples.

The following examples, which set forth the best mode contemplated by the inventor of carrying out the invention, serve to illustrate the invention.

EXAMPLE 1

(A) 1 - nitroso-4-phenyl-4-propionylpiperidine.—To a solution containing 20.4 g. (0.08 mole) of 4-phenyl-4-propionylpiperidine hydrochloride and eight drops of concentrated hydrochloric acid in 75 ml. of water was added at room temperature a solution of 6.9 g. (0.1 mole) of sodium nitrite in 75 ml. of water. The oil which originally separated solidified when the mixture was stirred at 40–45° C. for one hour. Recrystallized from methanol, the resulting 1-nitroso-4-phenyl-4-propionylpiperidine, consisting of yellow-white crystals, melted at 79–80° C.

Following the above procedure, using the appropriate substituted piperidine in place of 4-phenyl-4-propionylpiperidine, there are obtained the following 1-nitrosopiperidines:

(B) Ethyl 1-nitroso-2,3,5,6-tetramethyl-4-phenyl-4-piperidinecarboxylate;
(C) 1-nitroso-4-(3-butenoyl)-4-phenylpiperidine;
(D) 1-nitroso-4-(β-dimethylaminopropionyl)-4-phenylpiperidine;
(E) Ethyl 1-nitroso-4-benzyl-4-piperidinecarboxylate;
(F) Ethyl 1-nitroso-4-(2-thienyl)-4-piperidinecarboxylate;
(G) Ethyl 1-nitroso-4-(2-pyridyl)-4-piperidinecarboxylate;
(H) Ethyl 1-nitroso-4-(1-naphthyl)-4-piperidinecarboxylate;
(I) Ethyl 1-nitroso-4-(3-methoxyphenyl)-piperidinecarboxylate;
(J) 1-nitroso-4-cyclohexanecarbonyl-4-phenylpiperidine;
(K) 1-nitroso-4-phenylacetyl-4-phenylpiperidine;
(L) 1-nitroso-4-(β-phenylpropionyl)-4-phenylpiperidine;
(M) Ethyl 1-nitroso-4-[2-(1-hydroxynaphthyl)]-4-piperidinecarboxylate;
(N) Ethyl 1-nitroso-4-(3,4-dihydroxyphenyl)-4-piperidinecarboxylate;
(O) Ethyl 1-nitroso-3-methyl-4-phenyl-4-piperidinecarboxylate;
(P) Ethyl 1-nitroso-4-(2-hydroxyphenyl)-4-piperidinecarboxylate;
(Q) Ethyl 1-nitroso-4-(2-methylphenyl)-4-piperidinecarboxylate;
(R) 1-nitroso-4-(4-chlorophenyl)-4-acetylpiperidine;
(S) 1-nitroso-4-(3-trifluoromethylphenyl)-4-acetylpiperidine;
(T) Ethyl 1-nitroso-4-(3-benzyloxyphenyl)-4-piperidinecarboxylate;
(U) 1-nitroso-4-(3-benzyloxyphenyl)-4-propionylpiperidine;
(V) Ethyl 1-nitroso-4-(3,4-dimethoxyphenyl)-4-piperidinecarboxylate;
(W) Ethyl 1-nitroso-4-(4-acetoxyphenyl)-4-piperidinecarboxylate;
(X) Ethyl 1-nitroso-4-(2-methylmercaptophenyl)-4-piperidinecarboxylate;
(Y) Ethyl 1-nitroso-4-(2-methanesulfonylphenyl)-4-piperidinecarboxylate;
(Z) Ethyl 1-nitroso-4-(3-dimethylaminophenyl)-4-piperidinecarboxylate;
(AA) 1-nitroso-4-(4-phenylbutyl)-4-propionylpiperidine;
(AB) 1-nitroso-4-(2,4-dichlorobenzyl)-4-propionylpiperidine;
(AC) 1-nitroso-4-(3,4,5-trimethoxybenzyl)-4-cyclopropylcarbonylpiperidine;
(AD) 1-nitroso-4-[2-(3,4-diethoxyphenyl)ethyl]-4-cyclopentylcarbonylpiperidine;
(AE) 1-nitroso-4-(3-fluorophenyl)-4-(β-piperidinopropionyl)-5-methylpiperidine;
(AF) 1-nitroso-4-(4-quinolinyl)-4-(β-pyrrolidinopropionyl)piperidine;
(AG) 1-nitroso-4-(7-chloro-4-quinolinyl)-4-(β-morpholinopropionyl)piperidine;
(AH) 1-nitroso-4-(6-methoxy-4-quinolinyl)-4-(β-diethylaminopropionyl)piperidine;
(AI) 1-nitroso-4-(6,7-dimethoxy-2-quinolinyl)-4-(4-methoxyphenylacetyl)piperidine;
(AJ) 1-nitroso-4-(2-furyl)-4-[β-(3,4-dimethoxyphenyl)propionyl]piperidine;
(AK) 1-nitroso-4-[2-(2-furyl)ethyl]-4-(4-chlorophenylacetyl)piperidine;
(AL) 1-nitroso-4-[2-(3-pyridyl)ethyl]-4-(2,4,6-trimethylphenylacetyl)piperidine;
(AM) 1-nitroso-4-(2-thienylmethyl)-4-propionylpiperidine;
(AN) Ethyl 1-nitroso-4-(3-phenylpropyl)-4-piperidinecarboxylate;
(AO) Ethyl 1-nitroso-4-(2,4,6-trichlorobenzyl)-4-piperidinecarboxylate;
(AP) Ethyl 1-nitroso-4-[2-(3,4,5-trimethoxyphenyl)ethyl]-4-piperidinecarboxylate;
(AQ) Ethyl 1-nitroso-4-(4-n-butoxybenzyl)-4-piperidinecarboxylate;
(AR) Ethyl 1-nitroso-4-(3-fluorophenyl)-4-piperidinecarboxylate;
(AS) Ethyl 1-nitroso-4-(2-quinolinyl)-4-piperidinecarboxylate;
(AT) Ethyl 1-nitroso-4-(7-chloro-4-quinolinyl)-4-piperidinecarboxylate;
(AU) Ethyl 1-nitroso-4-(6-ethoxy-4-quinolinyl)-4-piperidinecarboxylate;
(AV) Ethyl 1-nitroso-4-(6,7-dimethoxy-4-quinolinyl)-4-piperidinecarboxylate;
(AW) Ethyl 1-nitroso-4-(2-furyl)-4-piperidinecarboxylate;
(AX) Ethyl 1-nitroso-4-[3-(2-furyl)propyl]-4-piperidinecarboxylate;
(AY) Ethyl 1-nitroso-4-(3-pyridyl)-4-piperidinecarboxylate;
(AZ) Ethyl 1-nitroso-4-[4-(4-pyridyl)butyl]-4-piperidinecarboxylate; and,
(BA) Ethyl 1-nitroso-4-[2-(3-thienyl)ethyl]-4-piperidinecarboxylate.

EXAMPLE 2

(A) 3-ethyl-4-phenyl - 1,2-diazabicyclo[2.2.2]octane—A solution containing 14.3 g. (0.058 mole) of 1-nitroso-4-phenyl-4-propionylpiperidine in 25 ml. of glacial acetic acid, 30 ml. of ethanol, and 20 ml. of water was added to a suspension of 19.6 g. (0.3 mole) of 98 percent zinc dust in 60 ml. of ethanol with vigorous stirring at 15–20° C. The mixture was stirred for fifteen minutes at 15° C. and then heated to 70° C. and filtered while hot. The filtrate was concentrated to one-third its original volume and made strongly basic with sodium hydroxide. Extraction of the basic solution and concentration of the extracts yielded an oil consisting of 3-ethyl-4-phenyl-1,2-diazabicyclo[2.2.2]octane. The hydrochloride salt, recrystallized from ethyl acetate-methanol, melted at 325–327° C.

Pharmacological evaluation of 3-ethyl-4-phenyl-1,2-diazabicyclo[2.2.2]octane hydrochloride has shown that this compound produced 50 percent inhibition of the cough reflex when administered orally to cats at a dose of 6.0 mg./kg.

The following compounds (Examples 2B through 2U) are prepared according to the foregoing procedure by substituting the appropriate 1-nitrosopiperidine for the 1-nitroso-4-phenyl-4-propionylpiperidine used above:

(B) 3-allyl-4-phenyl-1,2-diazabicyclo[2.2.2]octane from 1-nitroso-4-(3-butenoyl)-4-phenylpiperidine;
(C) 3-(β-dimethylaminoethyl)-4-phenyl-1,2-diazabicyclo[2.2.2]octane from 1-nitroso-4-(β-dimethylaminopropionyl)-4-phenylpiperidine;
(D) 3-cyclohexyl-4-phenyl-1,2-diazabicyclo[2.2.2]octane from 1-nitroso-4-cyclohexylcarbonyl-4-phenylpiperidine;
(E) 3-benzyl-4-phenyl-1,2-diazabicyclo[2.2.2]octane from 1-nitroso-4-phenylacetyl-4-phenylpiperidine;
(F) 3-phenylethyl-4-phenyl-1,2-diazabicyclo[2.2.2]octane from 1-nitroso-4-(β-phenylpropionyl)-4-phenylpiperidine;
(G) 3-methyl-4-(4-chlorophenyl)-1,2-diazabicyclo[2.2.2]octane from 1-nitroso-4-(4-chlorophenyl)-4-acetylpiperidine;
(H) 3-methyl-4-(3-trifluoromethylphenyl)-1,2-diazabicyclo[2.2.2]octane from 1-nitroso-4-(3-trifluoromethylphenyl)-4-acetylpiperidine;
(I) 3-ethyl-4-(4-phenylbutyl)-1,2-diazabicyclo[2.2.2]octane from 1-nitroso-4-(4-phenylbutyl)-4-propionylpiperidine;
(J) 3-ethyl-4-(2,4-dichlorobenzyl)-1,2-diazabicyclo[2.2.2]octane from 1-nitroso-4-(2,4-dichlorobenzyl)-4-propionylpiperidine;
(K) 3-cyclopropyl-4-(3,4,5-trimethoxybenzyl)-1,2-diazabicyclo[2.2.2]octane from 1-nitroso-4-(3,4,5-trimethoxybenzyl)-4-cyclopropylcarbonylpiperidine;
(L) 3-cyclopentyl-4-[2-(3,4-diethoxyphenyl)ethyl]-1,2-diazabicyclo[2.2.2]octane from 1-nitroso-4-[2-(3,4-diethoxyphenyl)ethyl]-4-cyclopentylcarbonylpiperidine;
(M) 3-(β-piperidinoethyl)-4-(3-fluorophenyl)-5-methyl-1,2-diazabicyclo[2.2.2]octane from 1-nitroso-4-(3-fluorophenyl)-4-(β-piperidinopropionyl)-5-methylpiperidine;
(N) 3-(β-pyrrolidinoethyl)-4-(4-quinolinyl)-1,2-diazabicyclo[2.2.2]octane from 1-nitroso-4-(4-quinolinyl)-4-(β-pyrrolidinopropionyl)piperidine;
(O) 3-(β-morpholinoethyl)-4-(7-chloro-4-quinolinyl)-1,2-diazabicyclo[2.2.2]octane from 1-nitroso-4-(7-chloro-4-quinolinyl)-4-(β-morpholinopropionyl)piperidine;
(P) 3-(β-diethylaminoethyl)-4-(6-methoxy-4-quinolinyl)-1,2-diazabicyclo[2.2.2]octane from 1-nitroso-4-(6-methoxy-4-quinolinyl)-4-(β-diethylaminopropionyl)piperidine;
(Q) 3-(4-methoxybenzyl)-4-(6,7-dimethoxy-2-quinolinyl)-1,2-diazabicyclo[2.2.2]octane from 1-nitroso-4-(6,7-dimethoxy-2-quinolinyl)-4-(4-methoxyphenylacetyl)piperidine;
(R) 3-[β-(3,4-dimethoxyphenyl)ethyl]-1,2-diazabicyclo[2.2.2]octane from 1-nitroso-4-(2-furyl)-4-[β-(3,4-dimethoxyphenyl)propionyl]piperidine;
(S) 3-(4-chlorobenzyl-4-[2-(2-furyl)ethyl]-1,2-diazabicyclo[2.2.2]octane from 1-nitroso-4-[2-(2-furyl)ethyl]-4-(4-chlorophenylacetyl)piperidine;
(T) 3-(2,4,6-trimethylbenzyl)-4-[2-(3-pyridyl)ethyl]-1,2-diazabicyclo[2.2.2]octane from 1-nitroso-3-[2-(3-pyridyl)ethyl]-4-(2,4,6-trimethylphenylacetyl)piperidine; and
(U) 3-ethyl-4-(2-thienylmethyl)-1,2-diazabicyclo[2.2.2]octane from 1-nitroso-4-(2-thienylmethyl)-4-propionylpiperidine.

EXAMPLE 3

(A) 2-acetyl-3-ethyl-4-phenyl-1,2 - diazabicyclo[2.2.2]octane-3 - ethyl - 4 - phenyl-1,2-diazabicyclo[2.2.2]octane (0.2 mole) was heated on a steam-bath for four hours with 10 ml. of acetic anhydride. The solution was then poured into water, and the mixture was made basic with sodium hydroxide. The resulting solid, consisting of 2-acetyl-3-ethyl-4-phenyl-1,2-diazabicyclo[2.2.2]octane, melted at 117.2–128.6° C. (corr.) after recrystallization from cyclohexane.

Pharmacological evaluation of 2-acetyl-3-ethyl-4- phenyl-1,2-diazabicyclo[2.2.2]octane has shown that this compound produced 14.2 percent inhibition of the cough reflex in cats when administered orally in doses of 25 mg./kg.

The following compounds (Examples 3B through 3Z) also are prepared by treating 3-ethyl-4-phenyl-1,2-diazabicyclo[2.2.2]octane with the designated acylating agent:

(B) 2-benzoyl-3-ethyl-4-phenyl-1,2-diazabicyclo[2.2.2]octane with benzoyl chloride;
(C) 2-methanesulfonyl-3-ethyl-4-phenyl-1,2-diazabicyclo[2.2.2]octane with methanesulfonyl chloride;
(D) 2-benzenesulfonyl-3-ethyl-4-phenyl-1,2-diazabicyclo[2.2.2]octane with benzenesulfonyl chloride;
(E) 2-(β-carboxyacryloyl)-3-ethyl-4-phenyl-1,2-diazabicyclo[2.2.2]octane with maleic anhydride;
(F) 2-isonicotinoyl-3-ethyl-4-phenyl-1,2-diazabicyclo[2.2.2]octane with isonicotinoyl chloride hydrochloride;
(G) 2-dichloroacetyl-3-ethyl-4-phenyl-1,2-diazabicyclo[2.2.2]octane with dichloroacetyl chloride;
(H) 2-(4-methylbenezenesulfonyl)-3-ethyl-4-phenyl-1,2-diazabicyclo[2.2.2]octane with p-toluenesulfonyl chloride;
(I) 2-(2-furoyl)-3-ethyl-4-phenyl-1,2-diazabicyclo[2.2.2]octane with furoyl chloride;
(J) 2-(2-thenoyl)-3-ethyl-4-phenyl-1,2-diazabicyclo[2.2.2]octane with 2-thenoyl chloride;
(K) 2-acrylyl-3-ethyl-4-phenyl-1,2-diazabicyclo[2.2.2]octane with acrylic anhydride;
(L) 2-methacrylyl-3-ethyl-4-phenyl-1,2-diazabicyclo[2.2.2]octane with methacrylic anhydride;
(M) 2-crotonyl-3-ethyl-4-phenyl-1,2-diazabicyclo[2.2.2]octane with crotonyl chloride;
(N) 2-cinnamoyl-3-ethyl-4-phenyl-1,2-diazabicyclo[2.2.2]octane with cinnamoyl chloride;
(O) 2-phenylacetyl-3-ethyl-4-phenyl-1,2-diazabicyclo[2.2.2]octane with phenylacetyl chloride;
(P) 2-n-hexanoyl-3-ethyl-4-phenyl-1,2-diazabicyclo[2.2.2]octane with n-hexanoyl chloride;
(Q) 2-(β-phenylpropionyl)-3-ethyl-4-phenyl-1,2-diazabicyclo[2.2.2]octane with β-phenylpropionyl chloride;
(R) 2-(4-chlorophenylacetyl)-3-ethyl-4-phenyl-1,2-diazabicyclo[2.2.2]octane with 4-chlorophenylacetyl chloride;
(S) 2-[β-(3,4-dimethoxyphenyl)propionyl]-3-ethyl-4-phenyl-1,2-diazabicyclo[2.2.2]octane with β-(3,4-dimethoxyphenyl)propionyl chloride;
(T) 2-(3,4,5-trimethylphenylacetyl)-3-ethyl-4-phenyl-1,2-diazabicyclo[2.2.2]octane with 3,4,5-trimethylphenylacetyl chloride;
(U) 2-[4-(4-methoxyphenyl)-2-butenoyl]-3-ethyl-4-phenyl-1,2-diazabicyclo[2.2.2]octane with 4-(4-methoxyphenyl)-2-butenoyl chloride;
(V) 2 - (3,4 - dichlorobenzoyl) - 3 - ethyl - phenyl-1,2-diazabicyclo[2.2.2]octane with 3,4 - dichlorobenzoyl chloride;
(W) 2 - (2,4,6 - trimethylbenzoyl) - 3 - ethyl - 4 - phenyl-1,2 - diazabicyclo[2.2.2]octane with 2,4,6 - trimethylbenzoyl chloride;
(X) 2 - (2 - naphthoyl) - 3 - ethyl - 4 - phenyl - 1,2-diazabicyclo[2.2.2]octane with 2-naphthoyl chloride;
(Y) 2 - (4 - chlorophenylsulfonyl) - 3 - ethyl - 4 - phenyl-1,2 - diazabicyclo[2.2.2]octane with 4 - chlorophenylsulfonyl chloride; and
(Z) 2 - (4 - ethoxyphenylsulfonyl) - 3 - ethyl - 4 - phenyl-1,2 - diazabicyclo[2.2.2]octane with 4-ethoxyphenylsulfonyl chloride.

EXAMPLE 4

(A) 3 - oxo - 4 - phenyl - 1,2 - diazabicyclo[2.2.2]octane - ethyl 1 - amino - 4 - phenylpiperidine - 4 - carboxylate (78.0 g.; 0.314 mole, prepared by reduction of ethyl 1 - nitroso - 4 - phenylpiperidine - 4 - carboxylate according to the procedure given in Example 2A) was heated in a flask under an air condenser at 120–210° C. for 1.5 hours, and the resulting oil was allowed to stand overnight. Trituration of the oil with cyclohexane gave a white solid consisting of 3 - oxo - 4 - phenyl - 1,2 - diazabicyclo[2.2.2]octane, which, after recrystallization from acetic acid-ethanol, melted at 248.0–249.2° C. (corr). The p-toluenesulfonic acid salt melted at 217.8–219.4° C. (corr.). 3 - oxo - 4 - phenyl - 1,2 - diazabicyclo[2.2.2]octane methochloride, prepared from the above compound by reacting it with methyl iodide to give 3 - oxo - 4 - phenyl - 1,2 - diazabicyclo[2.2.2]octane methiodide, followed by ion-exchange on a chloride ion-exchange resin, melted with decomposition at 221.8–222.6° C. (corr.) after recrystallization from ethanol.

Pharmacological evaluation of 3 - oxo - 4 - phenyl-1,2-diazabicyclo[2.2.2]octane has shown that this compound produced 17.6 percent inhibition of the cough reflex in cats when administered orally in doses of 25 mg./kg.

The following compounds (Examples 4B–4AF) also are prepared by heating the appropriate ethyl 1-aminopiperidine-4-carboxylate prepared by reduction of the corresponding 1-nitrosopiperidine;

(B) 4-phenyl-5,6,7,8-tetramethyl-3-oxo-1,2-diazabicyclo[2.2.2]octane;
(C) 4-benzyl-3-oxo-1,2-diazabicyclo[2.2.2]octane;
(D) 4-(2-thienyl)-3-oxo-1,2-diazabicyclo[2.2.2]octane;
(E) 4-(2-pyridyl)-3-oxo-1,2-diazabicyclo[2.2.2]octane;
(F) 4-(1-naphthyl)-3-oxo-1,2-diazabicyclo[2.2.2]octane;
(G) 4-(3-methoxyphenyl)-3-oxo-1,2-diazabicyclo[2.2.2]octane;
(H) 4-[2-(1-hydroxynaphthyl)]-3-oxo-1,2-diazabicyclo[2.2.2]octane;
(I) 4-(2-methylphenyl)-3-oxo-1,2-diazabicyclo[2.2.2]octane;
(J) 4-(3-benzyloxyphenyl)-3-oxo-1,2-diazabicyclo[2.2.2]octane;
(K) 4-(3,4-dimethoxyphenyl)-3-oxo-1,2-diazabicyclo[2.2.2]octane;
(L) 4-(4-acetoxyphenyl)-3-oxo-1,2-diazabicyclo[2.2.2]octane;
(M) 4-(2-methylmercaptophenyl)-3-oxo-1,2-diazabicyclo[2.2.2]octane;
(N) 4-(2-methanesulfonylphenyl)-3-oxo-1,2-diazabicyclo[2.2.2]octane;
(O) 4-(3-dimethylaminophenyl)-3-oxo-1,2-diazabicyclo[2.2.2]octane;
(P) 4-(3,4-dihydroxyphenyl)-3-oxo-1,2-diazabicyclo[2.2.2]octane;
(Q) 4-(2-hydroxyphenyl)-3-oxo-1,2-diazabicyclo[2.2.2]octane;
(R) 4-phenyl-5-methyl-3-oxo-1,2-diazabicyclo[2.2.2]octane;
(S) 4-(3-phenylpropyl)-3-oxo-1,2-diazabicyclo[2.2.2]octane;
(T) 4-(2,4,6-trichlorobenzyl)-3-oxo-1,2-diazabicyclo[2.2.2]octane;
(U) 4-[2-(3,4,5-trimethoxyphenyl)ethyl]-3-oxo-1,2-diazabicyclo[2.2.2]octane;
(V) 4-(4-n-butoxybenzyl)-3-oxo-1,2-diazabicyclo[2.2.2]octane;
(W) 4-(3-fluorophenyl)-3-oxo-1,2-diazabicyclo[2.2.2]octane;
(X) 4-(2-quinolinyl)-3-oxo-1,2-diazabicyclo[2.2.2]octane;
(Y) 4-(7-chloro-4-quinolinyl)-3-oxo-1,2-diazabicyclo[2.2.2]octane;
(Z) 4-(6-ethoxy-4-quinolinyl)-3-oxo-1,2-diazabicyclo[2.2.2]octane;
(AA) 4-(6,7-dimethoxy-4-quinolinyl)-3-oxo-1,2-diazabicyclo[2.2.2]octane;
(AB) 4-(2-furyl)-3-oxo-1,2-diazabicyclo[2.2.2]octane;
(AC) 4-(3-pyridyl)-3-oxo-1,2-diazabicyclo[2.2.2]octane;
(AD) 4-[4-(4-pyridyl)butyl]-3-oxo-1,2-diazabicyclo[2.2.2]octane;
(AE) 4-[2-(3-thienyl)ethyl]-3-oxo-1,2-diazabicyclo[2.2.2]octane; and
(AF) 4-[3-(2-furyl)propyl]-3-oxo-1,2-diazabicyclo[2.2.2]octane.

EXAMPLE 5

(A) 4-phenyl-1,2-diazabicyclo[2.2.2]octane.—To a suspension of 4.0 g. (0.1 mole) of lithium aluminum hydride in 100 ml. of tetrahydrofuran was added 9.0 g. (0.045 mole) of 4-phenyl-3-oxo-1,2-diazabicyclo[2.2.2]octane. The mixture was refluxed seven hours with stirring and was allowed to stand overnight. The complex was decomposed with water and sodium hydroxide, filtered, and the filtrate concentrated to an oil. The oil, consisting of crude 4-phenyl - 1,2 - diazabicyclo[2.2.2]octane, yielded crystals from n-hexane which melted at 97–99° C. The hydrochloride salt was prepared in ether and was recrystallized from ethanol-ether. The resulting pure 4-phenyl-1,2-diazabicyclo[2.2.2]octane hydrochloride melted at 208.2–208.8° C. (corr.).

Pharmacological evaluation has shown that 4-phenyl-1,2-diazabicyclo[2.2.2]octane hydrochloride produced 50 percent inhibition of the cough reflex in cats when administered orally in doses of 16.5 mg./kg.

The following compound (Examples 5B–5AE) are prepared by reducing the corresponding 3-oxo compounds according to the above procedure:

(B) 4-phenyl-5,6,7,8-tetramethyl-1,2-diazabicyclo[2.2.2]octane;
(C) 4-benzyl-1,2-diazabicyclo[2.2.2]octane;
(D) 4-(2-thienyl)-1,2-diazabicyclo[2.2.2]octane;
(E) 4.(2-pyridyl)-1,2-diazabicyclo[2.2.2]octane;
(F) 4-(1-naphthyl)-1,2-diazabicyclo[2.2.2]octane;
(G) 4-(3-methoxyphenyl)-1,2-diazabicyclo[2.2.2]octane;
(H) 4-[2-(1hydroxynaphthyl]-1,2-diazabicyclo[2.2.2]octane;
(I) 4-(2-methylphenyl)-1,2-diazabicyclo[2.2.2]octane;
(J) 4-(3-benzyloxyphenyl-1,2-diazabicyclo[2.2.2]octane;
(K) 4-(3,4-dimethoxyphenyl)-1,2-diazabicyclo[2.2.2]octane;
(L) 4-(4-acetoxyphenyl)-1,2-diazabicyclo[2.2.2]octane;
(M) 4-(2-methylmercaptophenyl)-1,2-diazabicyclo[2.2.2]octane;
(N) 4-(2-methanesulfonylphenyl) 1,2-diazabicyclo[2.2.2]octane;
(O) 4-(3-dimethylaminophenyl)-1,2-diazabicyclo[2.2.2]octane;
(P) 4-(3,4-dihydroxyphenyl)-1,2-diazabicyclo[2.2.2]octane;
(Q) 4-(2-hydroxyphenyl)-1,2-diazabicyclo[2.2.2]octane;
(R) 4-(3-phenylpropyl)-1,2-diazabicyclo[2.2.2]octane;
(S) 4-(2,4,6-trichlorobenzyl)-1,2-diazabicyclo[2.2.2]octane;
(T) 4-[2-(3,4,5-trimethoxyphenyl)ethyl]-1,2-diazabicyclo[2.2.2]octane;
(U) 4-(4-n-butoxybenzyl)-1,2-diazabicyclo[2.2.2]octane;
(V) 4-(3-fluorophenyl)-1,2-diazabicyclo[2.2.2]octane;
(W) 4-(2-quinolinyl)-1,2-diazabicyclo[2.2.2]octane;
(X) 4-(7-chloro-4-quinolinyl)-1,2-diazabicyclo[2.2.2]octane;
(Y) 4-(6-ethoxy-4-quinolinyl)-1,2-diazabicyclo[2.2.2]octane;
(Z) 4-(6,7-dimethoxy-4-quinolinyl)-1,2-diazabicyclo
(AA) 4-(2-furyl)-1,2-diazabicyclo[2.2.2]octane;
(AB) 4-(3-pyridyl) 1,2-diazabicyclo[2.2.2]octane;
(AC) 4-[4-(4-pyridyl)butyl]-1,2-diazabicyclo[2.2.2]octane;
(AD) 4-[2-(3-thienyl)ethyl]-1,2-diazabicyclo[2.2.2]octane; and (AE) 4-[3-(2-furyl)propyl]-1,2-diazabicyclo[2.2.2]octane.

EXAMPLE 6

2 - formyl-4-phenyl-1,2-diazabicyclo[2.2.2]octane.—To a solution containing 3.4 g. (0.018 mole) of 4-phenyl-1,2-diazabicyclo[2.2.2]octane in 5 ml. of chloroform was added 2.66 g. (0.018 mole) of chloral. The solution became warm spontaneously, and the product crystallized. Recrystallized from cyclohexane, the 2-formyl-4-phenyl-1,2-diazabicyclo[2.2.2]octane thus prepared, melted at 104.4–105.6° C. (corr.).

EXAMPLE 7

(A) 2-methyl-4-phenyl-1,2-diazabicyclo[2.2.2]octane.— Following the procedure given in Example 5A, 4.0 g. (0.186 mole) of 2-formyl-4-phenyl - 1,2 - diazabicyclo [2.2.2]octane was reduced with 1.52 g. (0.04 mole) of lithium aluminum hydride. Recrystallized from isopropanol, the resulting 2-methyl-4-phenyl-1,2-diazabicyclo [2.2.2]octane hydrochloride melted at 196.4–198.6° C. (corr.).

Pharmacological evaluation has shown that 2-methyl-4-phenyl-1,2-diazabicyclo[2.2.2]octane hydrochloride produced 50 percent inhibition of the cough reflex in cats when administered in oral doses of 37.0 mg./kg.

Other 2-alkyl and 2-aralkyl-substituted 1,2-diazabicyclo [2.2.2]octanes (Examples 7B–7N) are prepared by reduction of the corresponding 2-acyl compounds as above, for example:

(B) 2-benzyl-3-ethyl-4-phenyl-1,2-diazabicyclo[2.2.2]octane by reducing 2-benzoyl-3-ethyl-4-phenyl-1,2-diazabicyclo[2.2.2]octane;
(C) 2,3-diethyl-4-phenyl-1,2-diazabicyclo[2.2.2]octane by reducing 2-acetyl-3-ethyl-4-phenyl - 1,2 - diazabicyclo [2.2.2]octane;
(D) 2-[1-(4-hydroxy-2-butenyl)]-3-ethyl-4-phenyl-1,2-diazabicyclo[2.22]octane by reducing 2-(β-carboxyacryloyl)-3-ethyl-4-phenyl-1,2-diazabicyclo[2.2.2]octane;
(E) 2-(4-pyridylmethyl)-3-ethyl-4-phenyl-1,2-diazabicyclo [2.2.2]octane by reducing 2 - isonicotinoyl - 3 - ethyl-4-phenyl-1,2-dizabicyclo[2.2.2]octane;
(F) 2 - n-heptyl-3-ethyl-4-phenyl-1,2-diazabicyclo[2.2.2] octane by reducing 2-n-hexanoyl-3-ethyl-4-phenyl-1,2-diazabicyclo[2.2.2]octane;
(G) 2-(3-phenylpropyl)-3-ethyl-4-phenyl-1,2-diazabicyclo [2.2.2]octane by reducing 2-(β-phenylpropionyl)-3-ethyl-4-phenyl-1,2-diazabicyclo[2.2.2]octane;
(H) 2-[2-(4-chlorophenyl)ethyl-3-ethyl]-4-phenyl-1,2-diazabicyclo[2.2.2]octane by reducing 2-(4-chlorophenylacetyl)-3-ethyl-4-phenyl-1,2-diazabicyclo[2.2.2] octane;
(I) 2-[3-(3,4-dimethoxyphenyl)propyl]-3-ethyl-4-phenyl-1,2-diazabicyclo[2.2.2]octane by reducing 2-[β-3,4-dimethoxyphenyl)propionyl] - 3 - ethyl - 4 - phenyl-1,2-diazabicyclo[2.2.2]octane;
(J) 2-[2-(3,4,5 - trimethylphenyl)ethyl]-3-ethyl-4-phenyl-1,2-diazabicyclo[2.2.2]octane by reducing 2-(3,4,5-trimethylphenylacetyl)-3-ethyl-4-phenyl-1,2 - diazabicyclo [2.2.2]octane;
(K) 2-[4-(4-methoxyphenyl)-2-butenyl]-3-ethyl-4-phenyl-1,2-diazabicyclo[2.2.2]octane by reducing 2-[4-(4-methoxyphenyl)-2-butenoyl] - 3 - ethyl-4-phenyl-1,2-diazabicyclo[2.2.2]octane;
(L) 2-(3,4 - dichlorobenzyl)-3-ethyl-4-phenyl-1,2-diazabicyclo[2.2.2]octane by reducing 2-(3,4-dichlorobenzoyl)-3-ethyl-4-phenyl-1,2-diazabicyclo[2.2.2]octane;
(M) 2-(2,4,6-trimethylbenzyl)-3-ethyl-4-phenyl-1,2-diazabicyclo[2.2.2]octane by reducing 2-(2,4,6-trimethylbenzoyl)-3-ethyl-4-phenyl - 1,2 - diazabicyclo[2.2.2]octane; and
(N) 2-(2-naphthylmethyl)-3-ethyl-4-phenyl-1,2-diazabicyclo[2.2.2]octane by reducing 2-(2-naphthoyl)-3-ethyl-4-phenyl-1,2-diazabicyclo[2.2.2]octane.

EXAMPLE 8

(A) 4-phenyl - 2 - phenylcarbamyl - 1,2 - diazabicyclo [2.2.2]octane—When to a solution containing 3.6 g. (0.02 mole) of 4-phenyl-1,2-diazabicyclo[2.2.2]octane in 30 ml. of benzene was added 2.5 g. (0.021 mole) of phenyl isocyanate; a solid product precipitated. Recrystallized from toluene, the 4-phenyl-2-phenylcarbamyl-1,2-diazabicyclo[2.2.2]octane thus prepared melted at 196.4–198.2° C. (corr.).

Pharmacological evaluation has shown that 4-phenyl-2-phenylcarbamyl - 1,2 - diazabicyclo[2.2.2]octane produced 12.5 percent inhibition of the cough reflex in cats when administered orally in doses of 25 mg./kg.

The following compounds (Examples 8B–8M) are prepared according to the above procedure by substituting for phenyl isocyanate the designated cyanate or isocyanate:

(B) 4-phenyl-2-carbamyl-1,2-diazabicyclo[2.2.2]octane with potassium cyanate;
(C) 4-phenyl-2-(4-methoxyphenylcarbamyl)-1,2-diazabicyclo[2.2.2]octane with 4-methoxyphenyl isocyanate;
(D) 4-phenyl-2-n-butylcarbamyl-1,2-diazabicyclo[2.2.2] octane with n-butyl isocyanate;
(E) 4-phenyl-2-ethylcarbamyl-1,2-diazabicyclo[2.2.2] octane with ethyl isocyanate;
(F) 4-phenyl-2-n-hexylcarbamyl-1,2-diazabicyclo[2.2.2] octane with n-hexyl isocyanate;
(G) 4-phenyl-2-(4-methylphenylcarbamyl)-1,2-diazabicyclo[2.2.2]octane with 4-methylphenyl isocyanate;
(H) 4-phenyl-2-(4-n-propoxyphenylcarbamyl)-1,2-diazabicyclo[2.2.2]octane with 4-n-propoxyphenyl isocyanate;
(I) 4-phenyl-2-(3,4-dimethoxyphenylcarbamyl)-1,2-diazabicyclo[2.2.2]octane with 3,4-dimethoxyphenyl isocyanate;
(J) 4-phenyl-2-(4-chlorophenylcarbamyl)-1,2-diazabicyclo[2.2.2]octane with 4-chlorophenyl isocyanate;
(K) 4-phenyl-2-(2,4-dibromophenylcarbamyl)-1,2-diazabicyclo[2.2.2]octane with 2,4-dibromophenyl isocyanate;
(L) 4-phenyl-2-(2,4-dimethylphenylcarbamyl)-1,2-diazabicyclo[2.2.2]octane with 2,4-dimethylphenyl isocyanate; and
(M) 4-phenyl-2-isobutylcarbamyl-1,2-diazabicyclo [2.2.2]octane with isobutyl isocyanate.

EXAMPLE 9

(A) 2-acetyl - 4 - phenyl - 1,2 - diazabicyclo[2.2.2]octane—Following the procedure given in Example 3A, 2-acetyl - 4 - phenyl-1,2-diazabicyclo[2.2.2]octane was prepared from 4-phenyl-1,2-diazabicyclo[2.2.2]octane and acetic anhydride. Following recrystallization from cyclohexane, the product melted at 89.0–91.0° C. (corr.).

Pharmacological evaluation of 2-acetyl-4-phenyl-1,2-diazabicyclo[2.2.2]octane has shown that it inhibited 30 percent of the cough reflux in cats when administered orally in doses of 25 mg./kg.

Following the same procedure, there also are prepared from 4-phenyl-1,2-diazabicyclo[2.2.2]octane and the designated acyl halide the following compounds:

(B) 2-chloroacetyl-4-phenyl-1,2-diazabicyclo[2.2.2]octane, with chloroacetyl chloride;
(C) 2-(3-chloropropanoyl)-4-phenyl-1,2-diazabicyclo [2.2.2]octane, with 3-chloropropanoyl chloride;
(D) 2-trifluoroacetyl-4-phenyl-1,2-diazabicyclo[2.2.2] octane, with trifluoroacetyl chloride;
(E) 2-bromochloroacetyl-4-phenyl-1,2-diazabicyclo [2.2.2]octane, with bromochloroacetyl chloride;
(F) 2-dichloroacetyl-4-phenyl-1,2-diazabicyclo[2.2.2] octane, using dichloroacetyl chloride;
(G) 2-(2,2-dichloropropanoyl)-4-phenyl-1,2-diazabicyclo[2.2.2]octane, with 2,2-dichloropropanoyl chloride;

(H) 2-(2-bromobutanoyl)-4-phenyl-1,2-diazabicyclo[2.2.2]octane, with 2-bromobutanoyl bromide;
(I) 2-(2,2,3-trichlorobutanoyl)-4-phenyl-1,2-diazabicyclo[2.2.2]octane, with 2,2,3-trichlorobutanoyl chloride;
(J) 2-(2-chlorohexanoyl)-4-phenyl-1,2-diazabicyclo[2.2.2]octane, with 2-chlorohexanoyl chloride; and
(K) 2-(2,3-dichloroheptanoyl)-4-phenyl-1,2-diazabicyclo[2.2.2]octane, using 2,3-dichloroheptanoyl chloride.

EXAMPLE 10

(A) 2-cyanomethyl-4-phenyl-1,2-diazabicyclo[2.2.2]octane—A mixture of 4.7 g. (0.025 mole) of 4-phenyl-1,2-diazabicyclo[2.2.2]octane and 4.07 g. (0.05 mole) of 70 percent glycolonitrile was heated briefly to boiling allowed to stand for two hours and poured into water. The resulting solid was recrystallized from aqueous ethanol and from cyclohexane. The pure 2-cyanomethyl-4-phenyl-1,2-diazabicyclo[2.2.2]octane thus prepared melted at 72.2–74.0° C. (corr.).

Pharmacological evaluation has shown that 2-cyanomethyl-4-phenyl-1,2-diazabicyclo[2.2.2]octane produced 50 percent inhibition of the cough reflex in cats when administered orally in doses of 63 mg./kg.

The following compounds (Examples 10B–10L) also are prepared according to the above procedure by treating 4-phenyl-1,2-diazabicyclo[2.2.2]octane with the designated reactants:
(B) 2-(2-cyanoethyl)-4-phenyl-1,2-diazabicyclo[2.2.2]octane, with acrylonitrile;
(C) 2-(2-hydroxyethyl)-4-phenyl-1,2-diazabicyclo[2.2.2]octane, with ethylene oxide;
(D) 2-(2-pyridylethyl)-4-phenyl-1,2-diazabicyclo[2.2.2]octane, with 2-vinylpyridine;
(E) 2-allyl-4-phenyl-1,2-diazabicyclo[2.2.2]octane as the hydrobromide salt, from allyl bromide;
(F) 2-propargyl-4-phenyl-1,2-diazabicyclo[2.2.2]octane as the hydrobromide salt, from propargyl bromide;
(G) 2-cinnamyl-4-phenyl-1,2-diazabicyclo[2.2.2]octane as the hydrobromide salt, from cinnamyl bromide;
(H) 2-[2-(2-furyl)ethyl]-4-phenyl-1,2-diazabicyclo[2.2.2]octane, from 2-vinylfuran;
(I) 2-[2-(1-naphthyl)ethyl]-4-phenyl-1,2-diazabicyclo[2.2.2]octane, from 2-vinyl-1-naphthalene;
(J) 2-[3-(2-naphthyl)propyl]-4-phenyl-1,2-diazabicyclo[2.2.2]octane as the hydrochloride salt, from 3-(2-naphthyl)propyl chloride;
(K) 2-[2-(2-thienyl)ethyl]-4-phenyl-1,2-diazabicyclo[2.2.2]octane, from 2-vinylthiophene; and
(L) 2-[2-(2-quinolinyl)ethyl]4-phenyl-1,2-diazabicyclo[2.2.2]octane, from 2-vinylquinoline.

EXAMPLE 11

(A) Methyl 1-aminopiperidine-4-carboxylate-methyl 1-nitrosopiperidine-4-carboxylate (51.7 g.; 0.3 mole), was prepared from methyl isonipecotate according to the procedure given in Example IA, was added slowly to a stirred suspension of aluminum amalgam in moist ether. Violet refluxing was controlled by cooling the reaction mixture in ice. When the original reaction had subsided, 16 ml. of water was added dropwise, and the mixture was stirred for fifteen minutes. The ether layer was concentrated to a yellow-oil consisting of methyl 1-aminopiperidine-4-carboxylate, $n_D^{27}$ 1.4782.

(B) 3-oxo-1,2-diazabicyclo[2.2.2]octane-methyl 1-aminopiperidine-4-carboxylate (31.6 g.; 0.2 mole), was heated to 190–195° C. in 200 ml. of a biphenyl-diphenyl ether eutectic mixture (Dowtherm A) under nitrogen for three hours. The cooled mixture was poured into 1.5 l. of n-pentane. The resulting tan semi-solid was crystallized from acetonitrile and recrystallized from propionitrile.

The 3-oxo-1,2-diazabicyclo[2.2.2]octane thus prepared melted at 170.8–173.4° C. (corr.).

Pharmacological evaluation has shown that 3-oxo-1,2-diazabicyclo[2.2.2]octane inhibited 37 percent of the cough reflex in cats when administered orally in doses of 40 mg./kg.

EXAMPLE 12

1,2-diazabicyclo[2.2.2]octane—Following the procedure given in Example 5A, 12.6 g. (0.1 mole) of 3-oxo-1,2-diazabicyclo[2.2.2]octane was reduced in tetrahydrofuran with 7.6 g. (0.2 mole) of lithium aluminum hydride. The hydrochloride salt was prepared in ethanol-ether. Recrystallized from isopropanol-ethyl acetate, the pure 1,2-diazabicyclo[2.2.2]octane hydrochloride thus prepared melted with decomposition at 264.0–265.8° C. (corr.).

Pharmacological evaluation of 1,2-diazabicyclo[2.2.2]octane hydrochloride has shown that it inhibited 42.5 percent of the cough reflex in cats when administered orally in doses of 40 mg./kg.

EXAMPLE 13

(A) 2-phenylthiocarbamyl-1,2-diazabicyclo[2.2.2]octane—To a solution containing 3.36 g. (0.03 mole) of 1,2-diazabicyclo[2.2.2]octane in 20 ml. of benzene was added 4.05 g. (0.03 mole) of phenyl isothiocyanate. The solution, which became warm spontaneously, was allowed to stand for three hours, filtered, and concentrated under reduced pressure to give a white solid. Recrystallized from ethanol, the 2-phenylthiocarbamyl-1,2-diazabicyclo[2.2.2]octane thus prepared melted at 125.5–127.2° C. (corr.).

Pharmacological evaluation of 2-phenylthiocarbamyl-1,2-diazabicyclo[2.2.2]octane has shown that it inhibited 15 percent of the cough reflex in cats when administered orally in doses of 40 mg./kg.

The following compounds (Examples 13B–13M) are prepared according to the above procedure by substituting for phenyl isothiocyanate the designated isothiocyanate:
(B) 2-n-butylthiocarbamyl-1,2-diazabicyclo[2.2.2]octane with n-butyl isothiocyanate;
(C) 2-allylthiocarbamyl-1,2-diazabicyclo[2.2.2]octane with allyl isothiocyanate;
(D) 2-thiocarbamyl-1,2-diazabicyclo[2.2.2]octane with potassium thiocyanate;
(E) 2-ethylthiocarbamyl-1,2-diazabicyclo[2.2.2]octane with ethyl isothiocyanate;
(F) 2-n-hexylthiocarbamyl-2,2-diazobicyclo[2.2.2]octane with n-hexyl isothiocyanate;
(G) 2-(4-methylphenyl)thiocarbamyl-1,2-diazabicyclo[2.2.2]octane with 4-methylphenyl isothiocyanate;
(H) 2-(4-n-propoxyphenylthiocarbamyl)-1,2-diazabicyclo[2.2.2]octane with 4-n-propoxyphenyl isothiocyanate;
(I) 2-(3,4-dimethoxyphenylthiocarbamyl)-1,2-diazabicyclo[2.2.2]octane with 3,4-dimethoxyphenyl isothiocyanate;
(J) 2-(4-chlorophenylthiocarbamyl)-1,2-diazabicyclo[2.2.2]octane with 4-chlorophenyl isothiocyanate;
(K) 2-(2,4-dibromophenylthiocarbamyl)-1,2-diazabicyclo[2.2.2]octane with 2,4-dibromophenyl isothiocyanate; and
(L) 2-(2,4-dimethylphenylthiocarbamyl)-1,2-diazabicyclo[2.2.2]octane with 2,4-dimethylphenyl isothiocyanate; and
(M) 2-(isobutylthiocarbamyl)-1,2-diazabicyclo[2.2.2]octane with isobutyl isothiocyanate.

EXAMPLE 14

(A) 4-butyrylpiperidine-4-cyanopiperidine (0.2 mole) was treated with 0.7 mole of n-propyllithium in ether. Following hydrolysis of the lithium complex, the ether solution was extracted with dilute hydrochloric acid, and the acid extract was refluxed for five hours. The solution was then made basic with sodium hydroxide and extracted with ether. Concentration of the ether extract yielded an oil consisting of 4-butyrylpiperidine which boiled at 60–65° C. at 0.15 mm., $n_D^{28}$ 1.4681. The hydrochloride salt melted at 127–128.5° C.

(B) 3-propyl-1,2-diazabicyclo[2.2.2]octane — Following the procedure given in Example 1A, 1-nitroso-4-butyrylpiperidine was prepared from 15.4 g. (0.081 mole) of 4-butyrylpiperidine hydrochloride and 0.1 mole of nitrous acid.

Following the procedure given in Example 2A, the above 1-nitroso-4-butyrylpiperidine was reacted with zinc dust and acetic acid, to give 3-propyl-1,2-diazabicyclo[2.2.2]octane. The hydrochloride salt was prepared in ether. Recrystallized from ethanol-ether and from acetone, the resulting 3-propyl-1,2-diazabicyclo[2.2.2]octane hydrochloride melted at 223.0–224.8° C. (corr.).

3-propyl-1,2-diazabicyclo[2.2.2]octane can also be prepared by reducing 1-nitroso-4-butyrylpiperidine with aluminum amalgam in moist ether according to the procedure given in Example 11A.

EXAMPLE 15

(A) 4-acetyl-1-nitroso-4-phenylpiperidine — Following the procedure given in Example 1A, 4-acetyl-4-phenylpiperidine was treated with a slight excess of nitrous acid to give 4-acetyl-1-nitroso-4-phenylpiperidine, which melted at 58–60° C.

(B) 3 - methyl - 4 - phenyl - 1,2 - diazabicyclo[2.2.2]octane—Following the procedure given in Example 2A, 4-acetyl-4-phenyl-1-nitroso-piperidine (37.7 g.; 0.163 mole) was reduced with zinc dust and acetic acid to give 3-methyl-4-phenyl-1,2-diazabicyclo[2.2.2]octane hydrochloride as a yellow oil. The hydrochloride salt, prepared in ether and recrystallized from ethanol melted with decomposition at 330–332° C.

Pharmcological evaluation of 3-methyl-4-phenyl-1,2-diazabicyclo[2.2.2]octane hydrochloride has shown that it inhibited 31 percent of the cough reflux in cats when administered orally in doses of 40 mg./kg.

EXAMPLE 16

(A) 4-octanoyl-4-phenylpiperidine—A solution containing 138.2 g. (0.5 mole) of 1-benzyl-4-cyano-4-phenylpiperidine in 700 ml. of dry toluene was added to a solution containing 1.5 moles of n-heptylmagnesium bromide in 700 ml. of absolute ether. The ether was distilled from the reaction mixture, and the remaining solution was refluxed for two hours. The complex was then hydrolyzed with 2 kg. of ice and 500 ml. of concentrated hydrochloric acid and the aqueous phase was refluxed for six hours. The solution was made basic with sodium hydroxide and extracted with ether. The oil remaining after distillation of ether was crystallized from n-pentane. The 1-benzyl-4-octanoyl-4-phenylpiperidine thus prepared melted at 71.5–72.5° C.

The 1-benzyl - 4 - octanoyl-4-phenylpiperidine prepared above was hydrogenated over 10 percent palladium-on-charcoal in acetic acid-ethanol for four hours at 45° C. The catalyst was removed by filtration, and the filtrate was concentrated to an oil which consisted of crude 4-octanoyl-4-phenylpiperidine. The hydrochloride salt, prepared in ether-ethanol, melted at 123.5°–125° C.

(B) 1-nitroso-4-octanoyl - 4 - phenylpiperidine—Following the procedure given in Example 1A, 63.8 g. (0.196 mol) of 4-octanoyl-4-phenylpiperidine hydrochloride was treated with a slight excess of nitrous acid to give 1-nitroso-4-octanoyl-4-phenylpiperidine.

(C) 3 - heptyl - 4 - phenyl - 1,2 - diazabicyclo[2.2.2]octane—Following the procedure given in Example 2A, 1-nitroso-4-octanoyl-4-phenylpiperidine was treated with an excess of zinc dust and acetic acid to give 3-heptyl-4-phenyl-1,2-diazabicyclo[2.2.2]octane as an orange oil. The hydrochloride salt was prepared in ethanol and was recrystallized from methyl ethyl ketone. Pure 3-heptyl-4-phenyl-1,2-diazabicyclo[2.2.2]octane hydrochloride thus prepared, melted at 222.2–224.0° C. (corr.).

Pharmacological evaluation has shown that 3-heptyl-4-phenyl-1,2-diazabicyclo[2.2.2]octane inhibited 50 percent of the cough reflex in cats when administered orally in doses of 19 mg./kg.

EXAMPLE 17

(A) 4 - valeryl-1-nitroso-4-phenylpiperidine—Following the procedure given in Example 1A, 19.0 g. (0.067 mole) of 4-valeryl-4-phenylpiperidine hydrochloride (prepared according to the procedure given in Example 16A) from 1 - benzyl-4-cyano-4-phenylpiperidine and n-butyllithium [M.P. 109–112° C.] was treated with an excess of nitrous acid to give 4-valeryl-1-nitroso-4-phenylpiperidine as an orange oil.

(B) 3 - butyl-4-phenyl-1,2-diazabicyclo[2.2.2]octane—Following the procedure given in Example 2A, 4-valeryl-4-phenyl-1-nitroso-piperidine was reduced with a excess of zinc dust and acetic acid to give 3-butyl-4-phenyl-1,2-diazabicyclo[2.2.2]octane as an oil. The hydrochloride salt was prepared in ether and recrystallized from isopropyl alcohol-ether and from propionitrile. The pure 3-butyl - 4 - phenyl-1,2-diazabicyclo[2.2.2]octane hydrochloride thus prepared, melted at 218.0–219.2° C. (corr.).

Pharmacological evaluation has shown that 3-butyl-4-phenyl-1,2-diazabicyclo[2.2.2]octane hydrochloride inhibited 45 percent of the cough reflex in cats when administered orally in doses of 25 mg./kg.

EXAMPLE 18

(A) 4 - butyryl-1-nitroso-4-phenylpiperidine—Following the procedure given in Example 1A, 4-butyryl-4-phenylpiperidine hydrochloride was treated with a slight excess of nitrous acid to give 4-buturyl-1-nitroso-4-phenylpiperidine, which melted at 94–95.5° C.

(B) 4-phenyl - 3 - n - propyl-1,2-diazabicyclo[2.2.2]-octane—Following the procedure given in Example 2A, 4-phenyl-4-butyryl-1-nitrosopiperidine was reduced with an excess of zinc dust and acetic acid to give 4-phenyl-4-n-propyl-1,2-diazabicyclo[2.2.2]octane as a yellow oil. The hydrochloride salt was prepared in either and recrystallized from ethanol. A pure 4-phenyl-3-n-propyl-1,2-diazabicyclo[2.2.2]octane hydrochloride thus prepared, melted at 245.0–247.0° C. (corr.).

Pharmacological evaluation has shown that 4-phenyl-3-n-propyl-1,2 - diazabicyclo[2.2.2]octane hydrochloride produced inhibition of 50 percent of the cough reflex in cats when administered orally in doses of 11 mg./kg. This response was equivalent to that produced by the administration of 9.3 mg./kg. of codeine.

4-phenyl-3-n-propyl-1,2 - diazabicyclo[2.2.2]octane obtained as above can be reacted with various acids in addition to hydrochloric acid, for example, hydrobromic acid, hydriodic acid, sulfuric acid, sulfamic acid, citric acid, ethanesulfonic acid, benzenesulfonic acid, or quinic acid to give, respectively, the hydrobromide, hydriodide, sulfate, sulfonate, citrate, ethanesulfonate, benzenesulfonate or quinate salt of 4-phenyl-3-n-propyl-1,2-diazabicyclo[2.2.2]octane. Any other acid-addition salts can be prepared similarly using the desired acid. The free base can also be reacted with various esters as described above, e.g., methyl sulfate, allyl chloride, or benzyl bromide, to give, respectively, the methosulfate, allochloride, or benzobromide of 4-phenyl-3-n-propyl-1,2-diazabicyclo[2.2.2]-octane.

EXAMPLE 19

3-imino - 4 - phenyl-1,2-diazabicyclo[2.2.2]octane benzenesulfonate—Following the procedures given in Example 1A, 4-phenyl-4-cyanopiperidine is treated with an excess of nitrous acid to give 1-nitroso-4-cyano-4-phenylpiperidine, which is reduced according to the procedure given in Example 11A to give 1-amino-4-cyano-4-phenylpiperidine. The benzenesulfonate salt is prepared therefrom by reaction with benzenesulfonic acid. 3-imino-4-phenyl-1,2-diazabicyclo[2.2.2]octane benzenesulfonate is prepared from 1-amino-4-cyano-4-phenylpiperidine benzenesulfonate by heating it to 200–300° C. according to the procedure given in Example 4A.

EXAMPLE 20

4-phenyl - 3 - thiono-1,2-diazabicyclo[2.2.2]octane—4-phenyl-3-thiono - 1,2 - diazabicyclo[2.2.2]octane is prepared by treating 3-oxo-4-phenyl-1,2-diazabicyclo[2.2.2]-octane (Example 4A) with one molecular equivalent of phosphorus pentasulfide in refluxing xylene.

EXAMPLE 21

(A) 2-diethylaminoacetyl-4-phenyl - 1,2 - diazabicyclo-[2.2.2]octane is prepared by treating 2-chloroacetyl-4-phenyl-1,2-diazabicyclo[2.2.2]octane (Example 9B) with diethylamine in ethanol. Reduction of this product with lithium aluminum hydride according to the procedure given in Example 5A yields -(2-diethylaminoethyl)-4-phenyl-1,2-diazabicyclo[2.2.2]octane.

(B) 2-(3-dimethylaminopropyl) - 4 - phenyl-1,2-diazabicyclo[2.2.2]octane is similarly prepared as in Example 21A by reducing 2-($\beta$-dimethylaminopropionyl)-4-phenyl-1,2-diazabicyclo[2.2.2]octane, which, in turn, is prepared from 2-($\beta$-chloropropionyl)-4-phenyl - 1,2 - diazabicyclo-[2.2.2]octane (Example 9C) and dimethylamine.

(C) 2-(2 - aminoethyl) - 4 - phenyl-1,2-diazabicyclo-[2.2.2]octane is prepared by reducing 2-cyanomethyl-4-phenyl - 1,2 - diazabicyclo[2.2.2]octane (Example 10A) with lithium aluminum hydride.

EXAMPLE 22

(A) 4-amino-1-benzylpiperidine - 4 - carboxamide—To a solution containing 6.5 g. of potassium cyanide and 5.3 g. of ammonium chloride in about 75 ml. of water is added 18.9 g. (0.1 mole) of 1-benzyl-4-piperidinone and enough methanol to effect solution. The reaction mixture is allowed to stand overnight. Excess water is then added to the mixture, and the product, 4-amino-1-benzyl-4-cyanopiperidine, is extracted with ether. The solvent is removed under reduced pressure and the resulting oil is heated with 100 ml. of 90 percent sulfuric acid for 15 minutes at 90–100° C. The mixture is allowed to cool, poured into an excess of ice and water, made basic with excess ammonium hydroxide, and extracted with chloroform. The solvent is removed under reduced pressure to give 4-amino-1-benzylpiperidine-4-carboximide.

(B) 4 - trifluoroacetylamino - 1 - benzylpiperidine-4-carboxamide is prepared according to conventional procedures by reacting 4-amino-1-benzylpiperidine-4-carboxamide base with trifluoroacetic anhydride.

(C) 4-trifluoroacetylaminopiperidine-4-carboxamide—Following the procedure given in the second paragraph of Example 16A, 4-trifluoroacetylaminopiperidine-4-carboxamide is prepared by hydrogenolysis of 4-trifluoroacetylamino-1-benzylpiperidine-4-carboxamide over palladium-on-charcoal catalyst.

(D) 1 - nitroso-4-trifluoroacetylaminopiperidine-4-carboxamide—Following the procedure given in Example 1A, 4-trifluoroacetylaminopiperidine-4-carboxamide is reacted with nitrous acid to give 1-nitroso-4-trifluoroacetyl-aminopiperidine-4-carboxamide.

(E) 1-amino - 4 - trifluoroacetylaminopiperidine-4-carboxamide—Following the procedure given in Example 11A, 1-nitroso-4-trifluoroacetylaminopiperidine-4-carboxamide is reduced with zinc dust and acetic acid to give 1-amino-4-trifluoroacetylaminopiperidine-4-carboxamide.

(F) 3-oxo-4-trifluoroacetylamino - 1,2 - diazabicyclo-[2.2.2]octane—Following the procedure given in Example 4A, 1-amino-4-trifluoroacetylaminopiperidine - 4 - carboxamide as the hydrochloride salt is heated at 120–210° C. for one hour to give 3-oxo-4-trifluoroacetylamino-1,2-diazabicyclo[2.2.2]octane.

(G) 4 - amino-3-oxo-1,2-diazabicyclo[2.2.2]octane—A solution containing 3-oxo-4-trifluoroacetylamino-1,2-di-azabicyclo[2.2.2]octane in ethanolic ammonium hydroxide is allowed to stand overnight to give 4-amino-3-oxo-1,2-diazabicyclo[2.2.2]octane.

EXAMPLE 23

4 - hydroxy-3-oxo-1,2-diazabicyclo[2.2.2]octane—Following the general procedure outlined in Example 22A–22G, 4-hydroxy-3-oxo - 1,2 - diazabicyclo[2.2.2]octane is prepared from N-benzyl-4-piperidone cyanohydrin.

EXAMPLE 24

(A) 2-(6 - methoxycinchoninoyl)-4-phenyl-1,2-diazabicyclo[2.2.2]octane—To 9.0 g. of 6-methoxycinchoninic acid (6-methoxy-3-quinolinecarboxylic acid) suspended in 50 ml. of chloroform was added 20 ml. of thionyl chloride. The mixture was refluxed for eight hours and then concentrated in vacuo to yield, as a yellow solid, 6-methoxycinchoninoyl chloride. To the solid acid chloride was added 150 ml. dimethylformamide and 8.2 g. of 4-phenyl-1,2-diazabicyclo[2.2.2]octane in 50 ml. of dimethylformamide and 20 ml. of triethylamine. The resulting hot mixture was allowed to stand for one hour and then poured into a mixture containing one liter of water and 200 ml. of 10% aqueous sodium carbonate solution. The resulting mixture was stirred briefly and the tan solid precipitate was collected. The solid was recrystallized once from 95% ethanol (using decolorizing charcoal) and a second time from acetonitrile. The remaining 6.0 g. of product was further purified by adding it as a solution in 100 ml. of chloroform to a column of 200 g. of silica gel in chloroform and then eluting the column with a solution containing 50 ml. of ethanol, 1000 ml. of chloroform and 200 ml. of benzene. The first 500 ml. of eluant yielded no solid, whereas each of the resulting successive fractions of 100 ml., 100 ml., 100 ml. and 300 ml. yielded a solid on evaporation. The solid fractions were combined and recrystallized from dioxane using decolorizing charcoal to yield 3.5 g. 2-(6-methoxycinchonin-oyl) - 4 - phenyl - 1,2 - diazabicyclo[2.2.2]octane, M.P. 225.5–228.5° C. (corr.).

The following compounds (Examples 24B–24H) are prepared according to the above procedure by substituting for 6-methoxycinchoninic acid the designated acid:

(B) 2-(3-quinolinecarboxyl)-4-phenyl-1,2-diazabicyclo-[2.2.2]octane, using 3-quinolinecarboxylic acid;

(C) 2-(7-chloro-3-quinolinecarbonyl)-4-phenyl-1,2-diazabicyclo[2.2.2]octane, using 7-chloro-3-quinoline-carboxylic acid;

(D) 2-(6,7-dimethoxy-3-quinolinecarbonyl)-4-phenyl-1,2-diazabicyclo[2.2.2]octane, using 6,7-dimethoxy-quinolinecarboxylic acid;

(E) 2-(4-methyl-1-naphthoyl)-4-phenyl-1,2-diazabicyclo[2.2.2]octane, using 4-methyl-1-naphthoic acid;

(F) 2-(7-methyl-4-quinolinecarbonyl)-4-phenyl-1,2-diazabicyclo[2.2.2]octane using 7-methyl-4-quinoline-carboxylic acid;

(G) 2-(4-methoxy-2-naphthoyl)-4-phenyl-1,2-diazabicyclo[2.2.2]octane, using 4-methoxy-2-naphthoic acid; and, (H) 2-(2,4-dichloro-1-naphthoyl)-4-phenyl-1,2-diazabicyclo[2.2.2]octane, using 2,4-dichloro-1-naphthoic acid.

I claim:

1. A compound of the formula

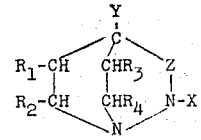

wherein:

$R_1$, $R_2$, $R_3$ and $R_4$ are each H or lower-alkyl;

X is H, lower-alkyl, Ar-lower-alkyl, lower-alkenyl, Ar-lower-alkenyl, lower-alkynyl, lower-alkanoyl, halo-lower-alkanoyl, carboxy-lower-alkanoyl, A-lower-alkanoyl, lower-alkenoyl, Ar-lower-alkenoyl, Ar-CO-, lower-alkanesulfonyl, Ar'-sulfonyl, carbamyl, thiocarbamyl, N-Ar'-thiocarbamyl, N-Ar'-carbamyl, N-(lower - alkyl)carbamyl, N - (lower - alkyl)thiocarbamyl, N-(lower-alkenyl)carbamyl, N-(lower-alkenyl)thiocarbamyl, cyano-lower-alkyl, hydroxy-lower-alkyl, amino-lower-alkyl, piperidino-lower-alkyl, pyrrolidino-lower-alkyl, morpholino-lower-alkyl, or di-(lower-alkyl)amino-lower-alkyl;

Y is H, OH, NH₂, Ar-lower-alkyl, or Ar;

Z is C=O, C=NH, C=S, CH₂ or CHR' where R' is lower-alkyl, lower-cycloalkyl having from three to six ring-carbon atoms and having from three to seven carbon atoms, lower-alkenyl, Ar'-lower-alkyl, piperidino-lower-alkyl, pyrrolidino - lower - alkyl, morpholino - lower - alkyl, or di-(lower-alkyl)amino-lower-alkyl;

Ar is phenyl, naphthyl, pyridyl, furyl, thienyl, quinolinyl, or phenyl, naphthyl or quinolinyl substituted in a benzene ring thereof by from one to three substituents selected from lower-alkyl, halo, lower-alkoxy, benzyloxy, hydroxy, trifluoromethyl, lower-alkylmercapto, lower-alkanesulfonyl, lower-alkanoyloxy or di-(lower-alkyl)amino; and Ar' is phenyl or phenyl substituted by from one to three substituents selected from lower-alkyl, halo or lower-alkoxy.

2. A compound according to claim 1 of the formula

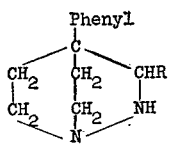

wherein R is lower-alkyl.

3. A compound according to claim 1 of the formula

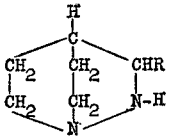

wherein R is lower-alkyl.

4. A compound according to claim 1 of the formula

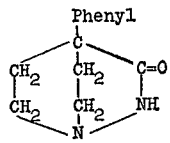

5. A compound according to claim 1 of the formula

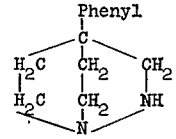

6. A compound according to claim of the formula

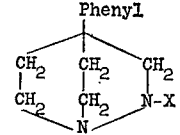

wherein X is lower-alkanoyl.

7. 3-oxo-1,2 - diazabicyclo[2.2.2]octane according to claim 1.

8. 1,2 - diazabicyclo[2.2.2]octane according to claim 1.

9. 2 - acetyl - 3 - ethyl-4-phenyl-1,2-diazabicyclo[2.2.2]octane according to claim 1.

10. 2 - formyl - 4 - phenyl - 1,2 - diazabicyclo[2.2.2]octane according to claim 6.

11. 2 - methyl - 4 - phenyl - 1,2 - diazabicyclo[2.2.2]octane according to claim 1.

12. 4 - phenyl - 2 - phenylcarbamyl - 1,2 - diazabicyclo-[2.2.2]octane according to claim 1.

13. 2 - phenylthiocarbamyl - 1,2 - diazabicyclo[2.2.2]octane according to claim 6.

14. 2 - acetyl - 4 - phenyl - 1,2 - diazabicyclo[2.2.2]octane according to claim 6.

15. 2 - cyanomethyl - 4 - phenyl - 1,2 - diazabicyclo-[2.2.2]octane according to claim 1.

16. 3 - propyl - 1,2 - diazabicyclo[2.2.2]octane according to claim 3.

17. 3 - methyl - 4 - phenyl - 1,2 - diazabicyclo[2.2.2]octane according to claim 2.

18. 3 - ethyl - 4 - phenyl - 1,2 - diazabicyclo[2.2.2]octane according to claim 2.

19. 4 - phenyl - 3 - propyl - 1,2 - diazabicyclo[2.2.2]octane according to claim 2.

20. 3 - butyl - 4 - phenyl - 1,2 - diazabicyclo[2.2.2]octane according to claim 2.

21. 3 - heptyl - 4 - phenyl - 1,2 - diazabicyclo[2.2.2]octane according to claim 2.

22. The process for preparing a 1,2-diazabicyclo[2.2.2]octane compound according to claim 1 where X is hydrogen and Z is C=O or CHR' which comprises subjecting a compound of the formula

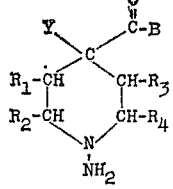

to a temperature within the range of about 0° C. to 300° C. sufficient to cause intramolecular cyclization, wherein B is -O-(lower-alkyl) or R' where R' is lower-alkyl, lower-cycloalkyl having from three to six ring-carbon atoms and having from three to seven carbon atoms, lower-alkenyl, Ar'-lower-alkyl, piperidino-lower-alkyl, pyrrolidino-lower-alkyl, morpholino-lower-alkyl or di - (lower-alkyl)amino-lower alkyl, R₁, R₂, R₃ and R₄ are each H or lower-alkyl, and Y is H, Ar-lower-alkyl, or Ar where Ar is phenyl, naphthyl, pyridyl, furyl, thienyl, quinolinyl, or phenyl, naphthyl or quinolinyl substituted in a benzene ring thereof by from one to three substituents selected from lower-alkyl, halo, lower-alkoxy, benzyloxy, trifluoromethyl, lower-alkylmercapto, lower-alkanesulfonyl, lower-alkanoyloxy or di-(lower-alkyl)amino, and Ar' is phenyl or phenyl substituted by from one to three substituents selected from lower-alkyl, halo or lower-alkoxy.

23. The process for preparing the compound of claim 4 which comprises heating a compound of the formula to a temperature of about 100° C. to 250° C.

24. The process for preparing the compound according to claim 2 which comprises reacting a compound of the formula

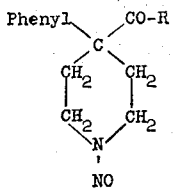

where R is lower-alkyl, with an excess of zinc and acetic acid.

25. The process according to claim 24 for preparing 4 - phenyl - 3 - propyl - 1,2 - diazabicyclo[2.2.2]octane which comprises reacting a compound of the formula

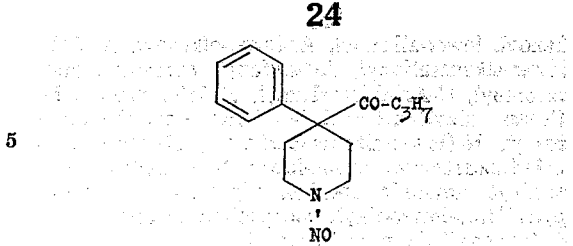

with an excess of zinc and acetic acid.

References Cited
UNITED STATES PATENTS 3,097,208    7/1963    Elpern _____ 260—250 A
3,198,801    8/1965    Carabateas _____ 260—250 A NICHOLAS S. RIZZO, Primary Examiner U.S. Cl. X.R.

260—247.5 R, 247.7 R; 424—250, 248

UNITED STATES PATENT OFFICE
CERTIFICATE OF CORRECTION

Patent No. 3,644,362 (S.N. 837,953)  Dated February 22, 1972

Inventor(s) Philip M. Carabateas

It is certified that error appears in the above-identified patent and that said Letters Patent are hereby corrected as shown below:

Column 1, line 39, between "in" and "composition" insert -- its --.

Column 2, line 66, "-COOH$_3$" should read -- -COOCH$_3$ --.

Column 4, lines 65-66, "morpholine" should read -- morpholino --.

Column 5, line 16, "alknyl" should read -- alkynyl --.

Column 7, line 41, ")-piperidine" should read -- )-4-piperidine --.

Column 10, line 57, "ethyl-phenyl" should read -- ethyl-4-phenyl --.

Column 12, line 40, "(1hydroxynaphthyl]" should read -- (1-hydroxynaphthyl)] --.

Column 12, line 69, after "bicyclo" insert -- [2.2.2]octane. --

Column 13, line 43, "dizabicyclo" should read -- diazabicyclo

Column 13, line 54, "[β-3,4-" should read -- [β-(3,4- --.

Column 16, line 47, "2,2-diazobicyclo" should read -- 1,2-diazabicyclo --.

Column 17, line 35, "Pharamcological" should read -- Pharmacological --.

Column 19, line 18, "-(2-" should read -- 2-(2- --.

Column 19, line 46, "carboximide" should read -- carboxamide

UNITED STATES PATENT OFFICE
CERTIFICATE OF CORRECTION

Patent No. 3,644,362 (S.N. 837,953) Dated February 22, 1972

Inventor(s)  Philip M. Carabateas

It is certified that error appears in the above-identified patent and that said Letters Patent are hereby corrected as shown below:

Column 19, line 67, "diazobicyclo" should read -- diazabicyclo --.

Column 20, line 43, "quinolinecarboxyl" should read -- quinolinecarbonyl --.

Column 20, lines 49-50, between "dimethoxy-" and "quinolinecarboxylic" insert -- 3- --.

Column 20, line 75, "A" should read -- Ar --.

Signed and sealed this 10th day of July 1973.

(SEAL)
Attest:

EDWARD M. FLETCHER, JR.
Attesting Officer

Rene Tegtmeyer
Acting Commissioner of Patents

_ db